United States Patent
Kriegmair

(10) Patent No.: US 8,195,424 B2
(45) Date of Patent: Jun. 5, 2012

(54) METHOD AND MEASURING SYSTEM FOR CHARACTERIZING A DEVIATION OF AN ACTUAL DIMENSION OF A COMPONENT FROM A NOMINAL DIMENSION OF THE COMPONENT

(75) Inventor: Josef Kriegmair, Langenpreising (DE)

(73) Assignee: MTU Aero Engines GmbH, Munich (DE)

( * ) Notice: Subject to any disclaimer, the term of this patent is extended or adjusted under 35 U.S.C. 154(b) by 391 days.

(21) Appl. No.: 12/413,047

(22) Filed: Mar. 27, 2009

(65) Prior Publication Data

US 2009/0248356 A1    Oct. 1, 2009

(30) Foreign Application Priority Data

Mar. 28, 2008 (DE) .................. 10 2008 016 025

(51) Int. Cl.
*G01B 21/00* (2006.01)
(52) U.S. Cl. ...................................... 702/155
(58) Field of Classification Search .............. 702/155, 702/182; 703/2; 700/30
See application file for complete search history.

(56) References Cited

U.S. PATENT DOCUMENTS 6,208,953 B1 * 3/2001 Milek et al. ............... 703/7
2002/0052712 A1 * 5/2002 Voser et al. ............... 702/182

* cited by examiner

Primary Examiner — Bryan Bui
(74) Attorney, Agent, or Firm — Crowell & Morning LLP

(57) ABSTRACT

A method and a measuring system for characterizing a deviation of an actual dimension of a component from a nominal dimension of the component, is disclosed. In an embodiment, the method includes a) determining at least one measured value characterizing the actual dimension at a position of the component by a measuring device; b) making a nominal value available with which the nominal dimension is characterized as a function of the position of the measured value; c) determining a spatial distance between the measured value and the nominal value; d) making a limiting criterion available with which a permissible deviation from the nominal value is characterized as a function of the position of the measured value; and e) determining a tolerance utilization value characterizing the deviation for the measured value as a function of the spatial distance and of the limiting criterion.

13 Claims, 3 Drawing Sheets

METHOD AND MEASURING SYSTEM FOR CHARACTERIZING A DEVIATION OF AN ACTUAL DIMENSION OF A COMPONENT FROM A NOMINAL DIMENSION OF THE COMPONENT

This application claims the priority of German Patent Document No. 10 2008 016 025.3, filed Mar. 28, 2008, the disclosure of which is expressly incorporated by reference herein.

BACKGROUND AND SUMMARY OF THE INVENTION

The invention relates to a method and a measuring system for characterizing a deviation of an actual dimension of a component from a nominal dimension of the component.

These types of methods and measuring systems are already known from the prior art and are used to check geometrical and positional tolerances of components. In this case, every component has an ideal geometric shape defined by the nominal dimension, which can be identified by a corresponding description, for example in a drawing or a computer model. However, because of unavoidable manufacturing tolerances in the creation of the concrete component, this ideal shape cannot normally be achieved or at least not for the entire component. As a result, it is important to be able to characterize the deviation of an actual dimension from a nominal dimension of the component sufficiently precisely in order to rework or discard the component, as the case may be.

What must be considered disadvantageous in known methods and measuring systems for characterizing this deviation is the fact that these methods and measuring systems are not suitable for evaluating components with complex geometries. As a result, the object of the present invention is creating a method as well as a measuring system of the type cited at the outset by means of which even deviations of the actual dimension can be characterized in components with complex geometries.

An embodiment of the inventive method, by means of which a deviation of an actual dimension can be characterized from a nominal dimension even in the case of a component having complex geometry, comprises at least the following steps: a) determining at least one measured value characterizing the actual dimension at a position of the component by means of a measuring device; b) making a nominal value available, by means of which the nominal dimension is characterized as a function of the position of the measured value; c) determining a spatial distance between the measured value and the nominal value; d) making a limiting criterion available, by means of which a permissible deviation from the nominal value is characterized as a function of the position of the measured value; and e) determining a tolerance utilization value characterizing the deviation for the measured value as a function of the spatial distance and of the limiting criterion. Therefore, in contrast to the prior art, the inventive method permits a location-dependent standardization and thus a homogenization of previously non-homogenous deviations or by tolerance bands spanned by the limiting criterion. The measured value and the nominal value are preferably determined or made available in this case as spatial coordinates. In this way, for example, even angular tolerances, in which the spatial distance between the measured value and the nominal value increases with an increasing distance from the common point of origin of the rays enclosing the angle, can be determined and reliably characterized. An analogous situation applies to components with convex or concave outer contours, bore holes, or the like.

An advantageous embodiment provides that the steps a) through e) are performed multiple times and/or at several positions of the component. This makes a further improvement in the precision of the characterization possible, because a plurality of measured values is taken into account, and the measuring accuracy is therefore improved. In this case, it can be provided that the deviation of the actual dimension from the nominal dimension of the component be characterized multiple times at one position in order to minimize potential measuring errors. Alternatively or additionally, the characterization can also be carried out at several positions of the component so that the deviations can be characterized over a partial area or surface area of the component. This permits an especially reliable decision to be made about whether the component must be reprocessed or discarded.

Additional advantages are yielded by an upper and/or a lower limit value being used as the limiting criterion. Through this the deviation of the actual dimension from the nominal dimension of the component can be characterized precisely as to whether the measured value lies above or below the nominal value. This supplies valuable information about any reprocessing steps that might be required.

In this case, it has been shown to be advantageous as a function of the concrete geometric design of the component if the upper and the lower limit values are selected with the same and/or a different spatial distance from the nominal value. This facilitates a spatially resolved and optimum definition of a tolerance band that can be adapted to the respective geometry of the component or to its intended purpose.

A further embodiment of the invention provides that the spatial distance in step c) is determined on the basis of a perpendicular and/or a height intersecting line on the nominal dimension at the position of the component. In this way, the respectively most suitable reference plane can be flexibly selected for the tolerance utilization value while taking optimum consideration of the geometric design of the component into account.

A further advantageous embodiment of the invention provides that a color value assigned to the specific tolerance utilization value determined in step e) is displayed by means of an optical display unit. On the basis of the location-dependent standardization of the deviation performed with the aid of the invention, it is possible to quickly and simply recognize on the basis of the assigned color value how strongly the permissible deviation at the affected position of the component was utilized or whether the respective measured value and thus the actual dimension lies above or below the maximum permissible deviation. If several measured values are determined at several positions of the component, surface areas of the component that can be derived therefrom can moreover be colorized depending upon tolerance utilization. The invention makes it possible for measured values with the same tolerance utilization to be assigned to the same color value, even tough the absolute distance between the individual measured values and nominal values is different. This facilitates especially quick classification and evaluation of components with complex geometries so that, for example, angular deviations in funnels or bore holes as well as deviations in the case of components such as engine blades of gas turbines can be characterized without any difficulty.

In this connection, it has been shown to be advantageous in another embodiment that the color value is assigned to the tolerance utilization value on the basis of a variable system of values and/or on the basis of predetermined fixed values and/or symmetrically. An assignment on the basis of a variable system of values makes it possible for example to take different areas of the component and thus different limiting criteria into consideration in an especially simple way. In the case of an assignment on the basis of predetermined fixed values, it can be provided that tolerance utilization values, which do not meet the limiting criterion, be provided with the same color value regardless of the concrete value of the spatial distance between the measured value and the nominal value. In contrast, tolerance utilization values, in which the deviation of the actual dimension from the nominal dimension lies within permissible deviation defined by the limiting criterion, can be assigned a different color value as a function of the respective spatial distance. In this case, for example, a color spectrum corresponding to the size of the distance can be used so that, for example, the brightness of the color value permits a conclusion to be drawn about the utilization of the tolerance band. In the case of a symmetrical assignment of the color value, on the other hand, tolerance utilization values whose measured values have the same (in terms of amount) location-dependent, standardized distance from the nominal value, e.g., ±30% or belong to the same utilization class, e.g., within the permissible deviation or outside of the permissible deviation from nominal value, receive the same color value.

Additional advantages are produced in this case by the range of the several measured values determined in step a) being used as the variable system of values. Thus, for example, a first color value can be determined via the smallest measured value determined with respect to its distance from the standard value, and a second color value can be determined via the greatest measured value determined with respect to its distance from the standard value, between which then a color spectrum is distributed. This makes an especially simple and quick evaluation of the deviations of the component possible independent of whether of the actual dimension has a positive or negative deviation from the nominal dimension.

Additional advantages are produced in that the component is a turbine component, in particular a gas turbine. In connection with the inventively improved characterization of deviations of the actual dimension, it is possible to make an especially quick, cost-effective and reliable assessment of the quality of this component class, which, on the one hand, has complex geometries and in which, on the other hand, adherence to dimensional accuracy is of special importance.

A further aspect of the invention relates to a measuring system for characterizing a deviation of an actual dimension of a component from a nominal dimension of the component, wherein the measuring system comprises a measuring device for determining at least one measured value characterizing the actual dimension at a position of the component; a storage device, by means of which a nominal value and a limiting criterion are made available, wherein, by means of the nominal value, the nominal dimension can be characterized as a function of the position of the measured value and, by means of the limiting criterion, a permissible deviation from the nominal value can be characterized as a function of the measured value; a detecting device for detecting a spatial distance between the measured value and the nominal value; and a determining device for determining a tolerance utilization value characterizing the deviation for the measured value as a function of the spatial distance and of the limiting criterion. In contrast to the prior art, the inventive measuring system makes it possible to standardize the deviation of the actual dimension in a location-dependent way so that even components with complex geometries can be evaluated quickly, simply and reliably with regard to their dimensionally accuracy. The embodiments and further developments presented in connection with the inventive method as well as their advantages apply corresponding to the inventive measuring system.

It has proved to be advantageous in another embodiment that the measuring device be embodied as an optical and/or acoustic and/or mechanical measuring device. This makes possible a particularly exact determination of the measured value and thus a correspondingly reliable characterization of the deviation of the actual dimension at the respective position of the component. The measuring device in this case may be comprised, for example, of a computer tomograph, a laser, an ultrasound transceiver, a caliper gauge, profile gauge, or the like.

Another advantageous embodiment of the invention provides that the detecting device and/or the determining device and/or the storage device is/are a part of a data processing system. This permits quick, simple and cost-effective processing of even larger amounts of data, thereby further improving the characterization of the deviation of the actual dimension. In addition, the measuring system can be embodied in this way to be portable and therefore be used in an especially flexible manner. The measured values or nominal values can be made available in this way as a so-called CAD model of the actual geometry or target geometry of the component.

An especially quick and simple assessment of the characterized deviation is made possible in a further embodiment in that the measuring system comprises an optical display unit, by means of which a color value assigned to the tolerance utilization value can be displayed. The display unit in this case may comprise a monitor, a stereoscopic display, a printer, or the like.

Additional advantages, features and details of the invention are disclosed on the basis of the following description of exemplary embodiments as well as on the basis of the drawings, in which the same or functionally equivalent elements are provided with identical reference numbers.

DETAILED DESCRIPTION OF THE DRAWINGS

Figure 1:
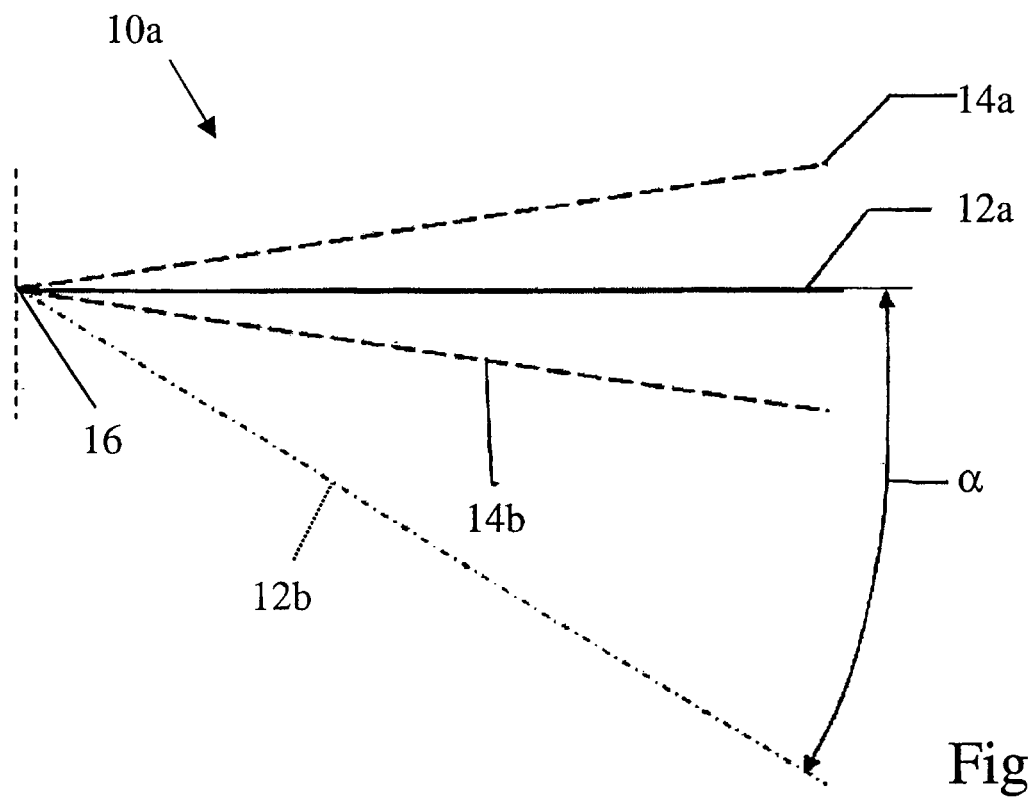
FIG. 1 is a schematic and partial cross section of a first component having two wall areas enclosing an angle.

FIG. 1 shows a schematic and partial cross section of a first component 10a having two wall areas 12a, 12b enclosing an angle α. The component 10*a* is embodied as a turbine component of a gas turbine, wherein the wall areas 12*a*, 12*b* delimit a funnel-shaped cooling air bore hole. High requirements with respect to position and shape are placed on cooling air bore holes in order to be able to guarantee a desired cooling capacity for the component 10*a*. In the present embodiment, the angle α is 15°, wherein a permissible deviation of the angular tolerances is ±2°. This angular tolerance therefore represents a limiting criterion, which is represented by an upper limit value 14*a* encompassing a system of values and a lower limit value 14*b* encompassing a system of values. In other words, the wall areas 12*a*, 12*b* define a nominal dimension of the component 10*a*, whereas the upper and the lower limit values 14*a*, 14*b* indicate a maximal permissible deviation of an actual dimension from this nominal dimension. As FIG. 1 makes clear, the distance between the nominal dimension and the permissible actual dimension increases with increasing distance from the common point of origin 16 of the two wall areas 12*a*, 12*b*.

Figure 2:
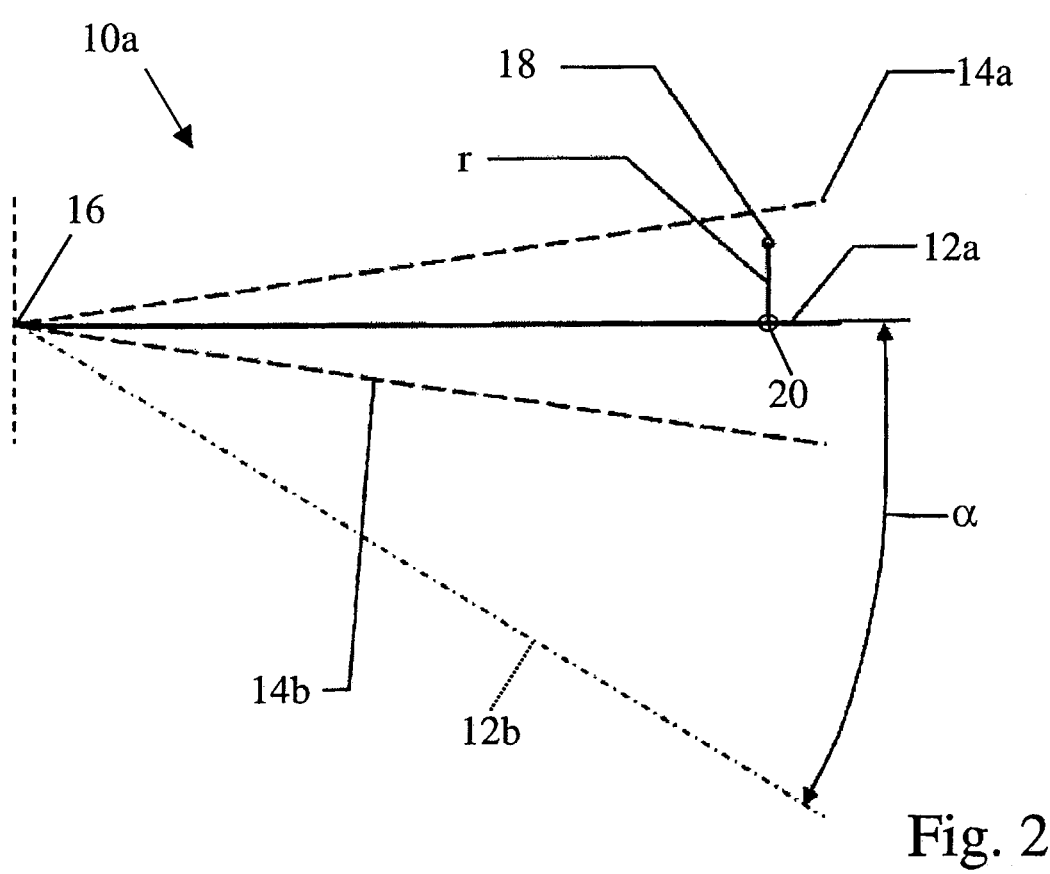
FIG. 2 is a schematic and partial cross section of the component depicted in FIG. 1, wherein, in addition, a measured value characterizing an actual dimension is represented.

FIG. 2 shows a schematic cross section of the first component 10*a*, wherein, in addition, a measured value 18 characterizing an actual dimension is shown. The measured value 18 is located at a spatial distance r from a nominal value 20, by means of which the nominal dimension of the wall area 12*a* at the position of the measured value 18 is characterized. Both the measured value 18 as well as the nominal value 20 are preferably determined or made available in this case in the form of spatial coordinates, wherein in this case a suitable coordinate system, e.g., a Cartesian coordinate system, is used as the reference system. The actual dimension of the component 10*a* therefore features a deviation from the nominal dimension in the present exemplary embodiment. Since the measured value 18 is located within the limit values 14*a*, 14*b* representing the limiting criterion, the component 10*a* possesses the required dimensional accuracy despite the deviation and can be used for its respective intended purpose without further reprocessing steps. On the other hand, the measured value 18 would, however, violate the limiting criterion, if it were to lie closer to the point of origin 16 with the same spatial distance r. In other words, the tolerance band spanning the limit values 14*a*, 14*b* is spatially non-homogenous. The pure knowledge of the spatial distance r does not permit any direct statement to be made about whether the actual dimension of the component 10*a* represents an impermissible deviation from the nominal dimension.

Figure 3:
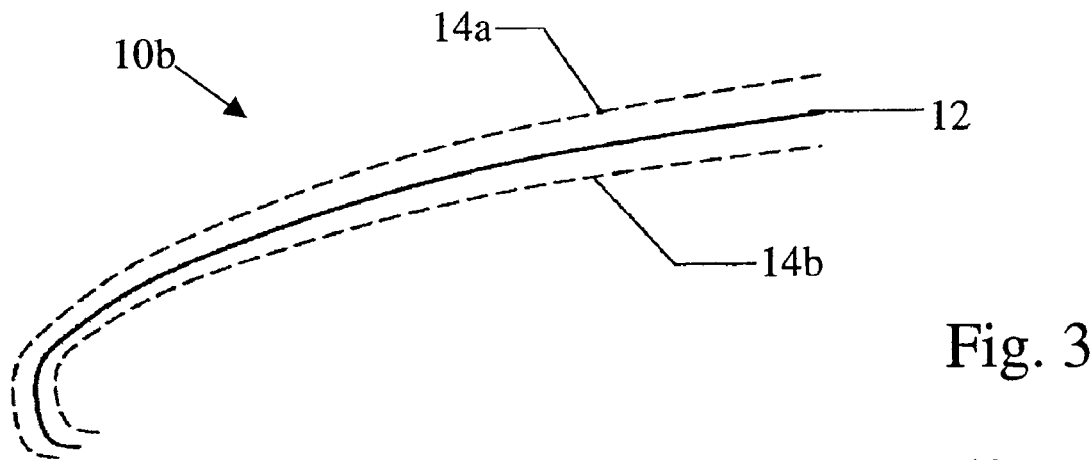
FIG. 3 is a schematic cross section of a second component having a bent outer contour.

FIG. 3 depicts a schematic cross section of a second component 10*b*, which is embodied as an engine blade of a gas turbine and, in contrast to the first component 10*a*, has a wall area 12 with a contour that is convex in cross section (airfoil). Again assigned to the wall area 12 are an upper and a lower limit value 14*a*, 14*b*, which define a limiting criterion for a permissible deviation of an actual dimension from the nominal dimension of the component 10*b* defined by the wall area 12. It can be seen particularly in this case that the limit values 14*a*, 14*b* do not run parallel to the wall area 12 so that the permissible deviation of an actual dimension is likewise location-dependent.

Figure 4:
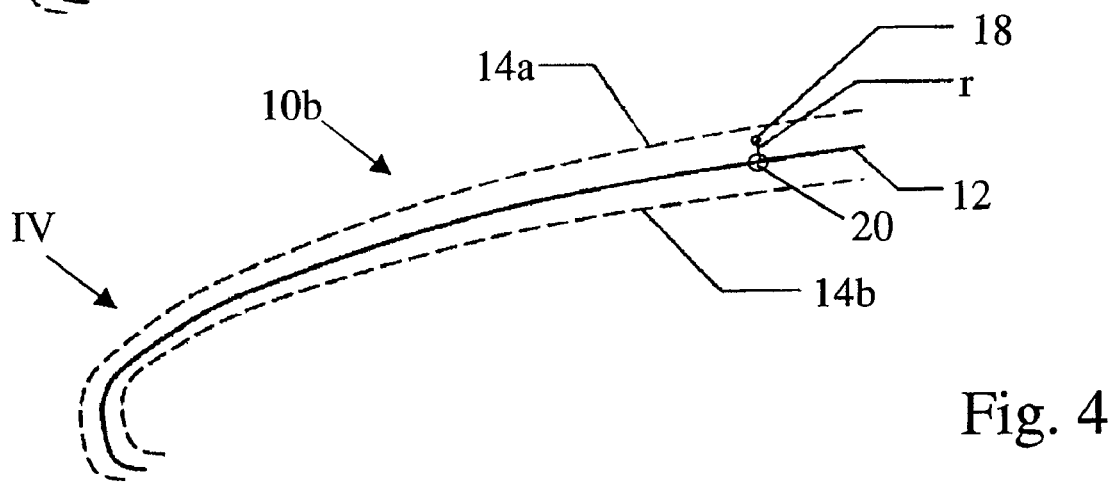
FIG. 4 is a schematic cross section of the component depicted in FIG. 3, wherein, in addition, a measured value characterizing an actual dimension is represented.

FIG. 4 depicts a schematic cross section of the second component 10*b*, wherein, in addition, a measured value 18 characterizing an actual dimension is shown. The measured value 18 in this case is also located within the tolerance range and has a spatial distance r with respect to the nominal value 20 characterizing the nominal dimension. It should also be noted in this case that the measured value 18, which would be determined for example at a position of the component 10*b* designated by arrow IV, would no longer meet the limiting criterion with the same (in terms of amount) distance r.

Figure 5:
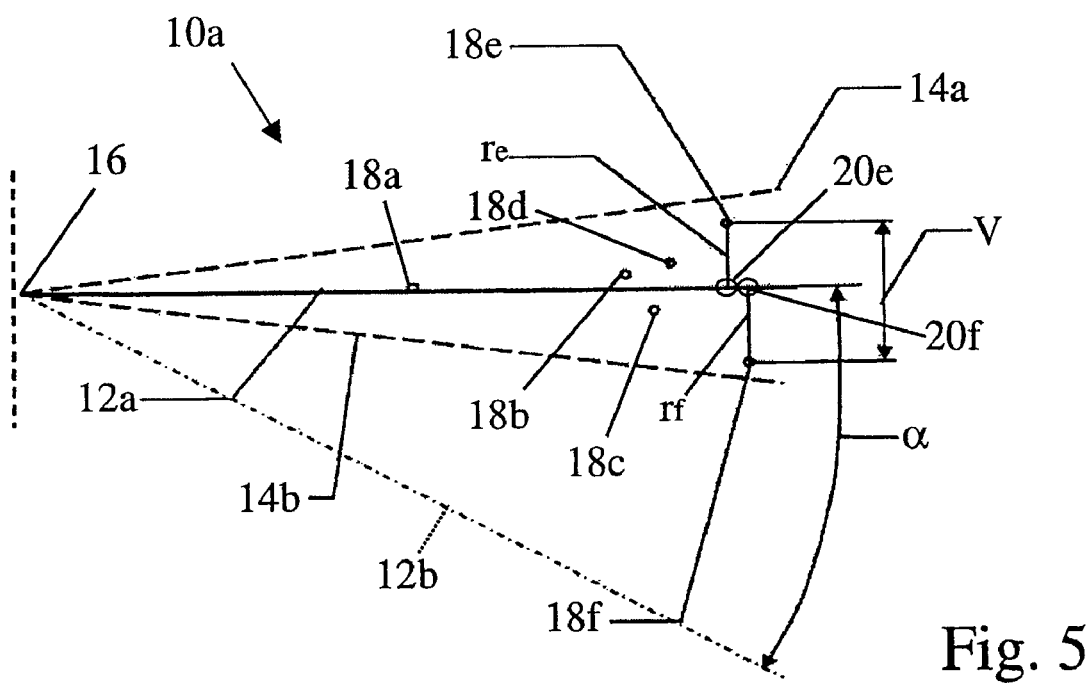
FIG. 5 is a schematic and partial cross section of the first component, wherein several measured values are shown, for which respective tolerance utilization values are determined, to which color values are assigned via a variable distribution.

FIG. 5 depicts a schematic and partial cross section of the first component 10*a*, wherein several measured values 18*a-f* are shown. The measured values 18*a-f*, which characterize the actual dimension of the component 10*a* at the affected positions, are initially determined by means of a measuring device. The measuring device in this case can basically be embodied as an optical, acoustic or mechanical measuring device. For each measured value 18*a-f*, a corresponding nominal value 20*a-f* is made available, by means of which the nominal dimension is characterized as a function of the position of the respective measured values 18*a-f*. For the sake of clarity, only the nominal values 20*e*, 20*f* assigned to measured values 18*e*, 18*f* are depicted in the present exemplary embodiment. The respective spatial distances $r_{a-f}$ of the measured values 18*a-f* from their assigned nominal values 20*a-f* can be determined optionally on the basis of a perpendicular and/or a height intersecting line on the nominal dimension at the respective position of the component 10*a*. Taking the upper and lower limit values 14*a*, 14*b* into account, a tolerance utilization value characterizing the respective deviation of the actual dimension from the nominal dimension of the component 10*a* can be determined for every measured value 18*a-f*. In this case, a tolerance utilization value of 0% is determined, for example, for measured values 18, which do not have a deviation from the nominal dimension and consequently possess a spatial distance r=0. A tolerance utilization value of 100% can be determined for measured values, which lie at the upper limit values 14*a*, and a tolerance utilization value of −100% can be determined for measured values 18, which lie on the lower limit value 14*b*. The upper and the lower limit values 14*a*, 14*b* therefore span a tolerance band. Measured values 18, which lie between the upper and the lower limit value 14*a*, 14*b*, accordingly obtain tolerance utilization values between ±100%. A location-dependent standardization of the measured values 18 is hereby achieved, whereby any deviations of the actual dimension from the nominal dimension of the component 10*a* can be characterized especially quickly and simply despite the complex geometry. To further accelerate and facilitate the evaluation of the quality of the component 10*b*, color values are assigned to the specific tolerance utilization values and then depicted by means of an optical display unit. The absolute values of the measured values 18 can be derived again, if required, via the tolerance band, the respective position with respect to the component 10*a*, the type of reference plane (perpendicular or height intersecting line) and the specific tolerance utilization value. Therefore, an at least partially three-dimensional model of the actual geometry of the component 10*a* can be determined and compared to the nominal geometry in the case of a sufficient number of measured values and nominal values 18, 20.

In the present exemplary embodiment, color values are assigned to the tolerance utilization values on the basis of a variable system of values. In this case, the measured values 18*a-f* are advantageously used as the variable system of values, wherein a first color value is assigned to the measured value 18*e* with the numerically largest distance $r_e$, and a second color value is assigned to the measured value 18*f* with the numerically smallest distance $r_f$. A suitable color spectrum V is therefore distributed between the two color values. This makes it possible to check and evaluate the dimensional accuracy of the component 10*a* especially quickly, simply and conveniently. On the basis of the respective color value it can be seen immediately how strong the permissible tolerance was utilized or whether the respective measuring points 18*a-f* lie within or outside of the limiting criterion. Measured values 18a-f having the same tolerance utilization values in this case receive the same color value, even though their absolute distance $r_{a-f}$ may be different.

Figure 6:
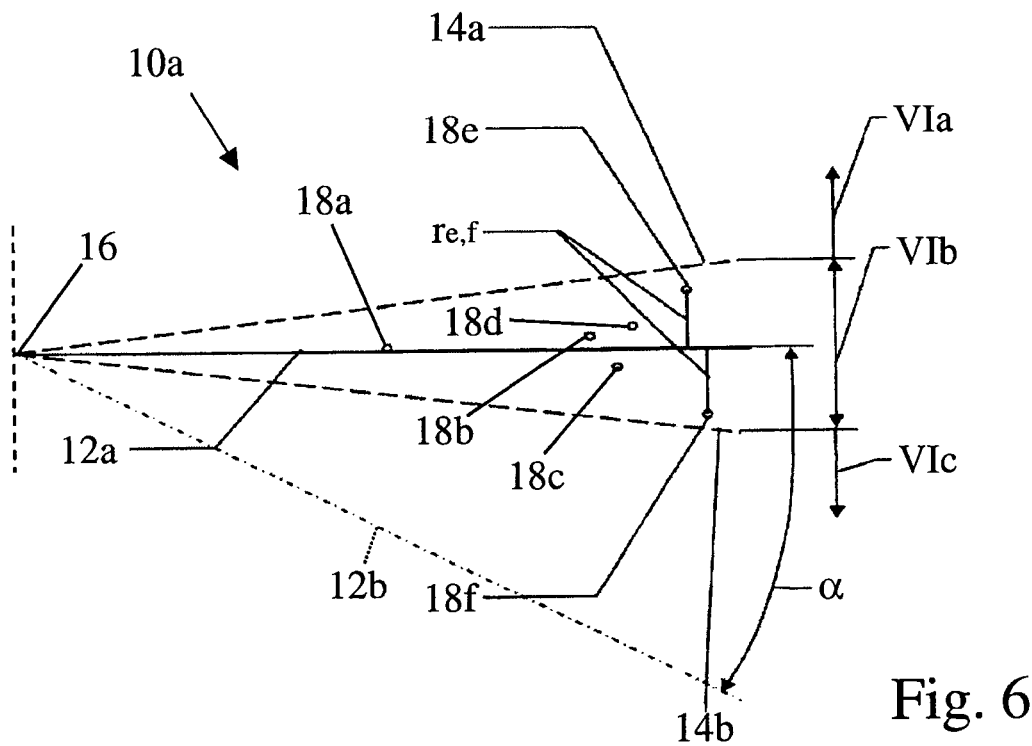
FIG. 6 is a schematic and partial cross section of the first component, wherein several measured values are shown, for which respective tolerance utilization values are determined, to which corresponding color values are assigned on the basis of predetermined fixed values.

FIG. 6 depicts a schematic and partial cross section of the first component 10a. In contrast to the preceding exemplary embodiment, in this case the color values are assigned to the tolerance utilization values on the basis of predetermined fixed values. In this case, all tolerance utilization values, which do not meet the limiting criterion and are located outside the limit values 14a or 14b, receive a pre-determined first color value, by means of which an impermissible dimensional accuracy of the component 10a is signaled. On the other hand, tolerance utilization values which are located within the bounds of the tolerance band spanning the limit values 14a, 14b, receive a uniform second color value that deviates from the first color value. As an alternative, it can be provided that tolerance utilization values between the upper and the lower limit values 14a, 14b are assigned a color value from a predetermined color spectrum corresponding to the respective distance r. In this way, three classes of tolerance utilization values VIa-c are obtained, from which the two classes VIa and VIc characterize an impermissible deviation of the actual dimension of the component 10a from the required nominal dimension.

Figure 7:
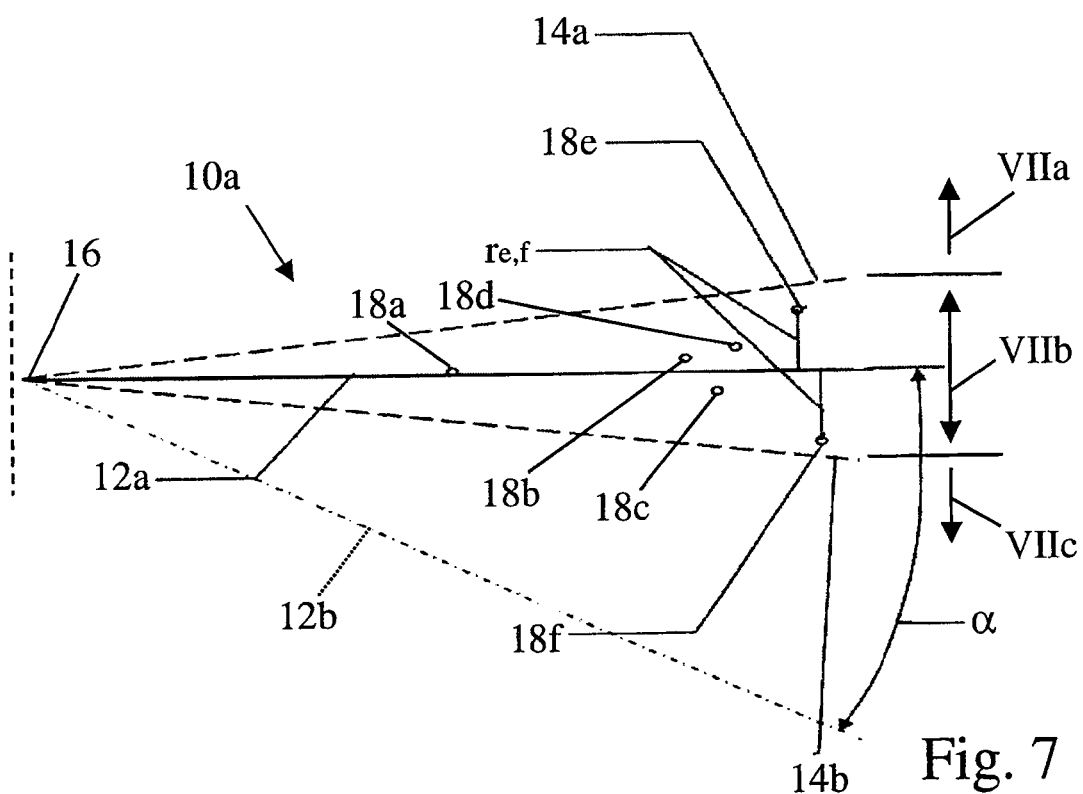
FIG. 7 is a schematic and partial cross section of the first component, wherein several measured values are shown, for which the tolerance utilization values are determined, to which color values are symmetrically assigned.

FIG. 7 depicts a schematic and partial cross section of the first component 10a, wherein the color values are assigned symmetrically to respective tolerance utilization values of the measured values 18a-f. In this case, the measured values 18 with the same tolerance utilization values (in terms of amount), e.g., ±30%, or measured values 18 in the same tolerance utilization class (e.g., outside of tolerance class VIIa, VIIc or within the tolerance class VIIb) receive the same color value. This also makes a quick and simple evaluation of the dimensional accuracy of the component possible, wherein any deviations of the actual dimension from the nominal dimension can be detected independent of the type of deviation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for characterizing a deviation of an actual dimension of a component from a nominal dimension of the component, comprising the steps of:
   a) determining a measured value characterizing the actual dimension at a position of the component by a measuring device;
   b) making a nominal value available with which the nominal dimension is characterized as a function of the position of the measured value;
   c) determining a spatial distance between the measured value and the nominal value, wherein the spatial distance is determined on a basis of a perpendicular and/or a height intersection line on the nominal dimension at the position of the component;
   d) making a limiting criterion available with which a permissible deviation from the nominal value is characterized as a function of the position of the measured value; and
   e) determining a tolerance utilization value characterizing a deviation for the measured value as a function of the spatial distance and of the limiting criterion.

2. The method according to claim 1, wherein the steps a) through e) are performed multiple times and/or at several positions of the component.

3. The method according to claim 1, wherein an upper and/or a lower limit value is used as the limiting criterion.

4. The method according to claim 3, wherein the upper and the lower limit values are selected with a same and/or a different spatial distance from the nominal value.

5. The method according to claim 1, wherein a color value is assigned to the tolerance utilization value determined in step e) and is displayed by an optical display unit.

6. The method according to claim 5, wherein the color value is assigned to the tolerance utilization value on a basis of a variable system of values and/or on a basis of predetermined fixed values and/or symmetrically.

7. The method according to claim 6, wherein the steps a) through e) are performed multiple times and/or at several positions of the component and wherein a range of several measured values determined in step a) is used as the variable system of values.

8. The method according to claim 1, wherein the component is a flow machine component.

9. The method according to claim 8, wherein the flow machine component is a gas turbine.

10. A measuring system for characterizing a deviation of an actual dimension of a component from a nominal dimension of the component, comprising:
    a measuring device, wherein the measuring device determines a measured value characterizing the actual dimension at a position of the component;
    a storage device, wherein the storage device makes available a nominal value and a limiting criterion, wherein with the nominal value the nominal dimension is characterized as a function of the position of the measured value and wherein with the limiting criterion a permissible deviation from the nominal value is characterized as a function of the position of the measured value;
    a detecting device, wherein the detecting device determines a spatial distance between the measured value and the nominal value and wherein the spatial distance is determined on a basis of a perpendicular and/or a height intersecting line on the nominal dimension at the position of the component; and
    a determining device, wherein the determining device determines a tolerance utilization value characterizing a deviation for the measured value as a function of the spatial distance and of the limiting criterion.

11. The measuring system according to claim 10, wherein the measuring device is an optical and/or an irradiating and/or an acoustic and/or a mechanical measuring device.

12. The measuring system according to claim 10, wherein the detecting device and/or the determining device and/or the storage device is a part of a data processing system.

13. The measuring system according to claim 10, wherein the measuring system includes an optical display unit, wherein a color value assigned to the tolerance utilization value is displayable.

* * * * *